United States Patent [19]

Mott

US005131776A

[11] Patent Number: 5,131,776

[45] Date of Patent: Jul. 21, 1992

[54] AQUEOUS PERMANENT COLORING COMPOSITION FOR A MARKER

[75] Inventor: Christine R. Mott, Walnutport, Pa.

[73] Assignee: Binney & Smith Inc., Eastern, Pa.

[21] Appl. No.: 702,892

[22] Filed: May 20, 1991

Related U.S. Application Data

[63] Continuation-in-part of Ser. No. 553,156, Jul. 13, 1990, abandoned.

[51] Int. Cl.$^5$ ............................................... B43K 5/02
[52] U.S. Cl. .................................. 401/198; 401/196; 106/20
[58] Field of Search .................. 106/20; 401/196–207

[56] References Cited

U.S. PATENT DOCUMENTS

| | | | |
|---|---|---|---|
| 4,104,219 | 8/1978 | Peters et al. | 260/29.6 RB |
| 4,880,465 | 11/1989 | Loria et al. | 106/20 |
| 5,009,536 | 4/1991 | Inoue et al. | 401/198 |
| 5,026,427 | 6/1991 | Mitchell et al. | 106/23 |

*Primary Examiner*—William R. Dixon, Jr.
*Assistant Examiner*—Margaret V. Einsmann
*Attorney, Agent, or Firm*—Leydig, Voit & Mayer

[57] ABSTRACT

An aqueous permanent coloring composition for a marking instrument includes a pigment, an alkali soluble acrylic resin, and a volatile pH regulant. The composition optionally includes a drying agent, an adhesion promoter, and/or a preservative. The composition is useful as a permanent ink or paint and has good fugitivity from skin.

3 Claims, No Drawings

AQUEOUS PERMANENT COLORING COMPOSITION FOR A MARKER

This application is a continuation-in-part of prior application, Ser. No. 07/,553,156, filed Jul. 13, 1990, now abandoned.

BACKGROUND OF THE INVENTION

1. The Field of the Invention

This invention relates generally to the field of inks. In one particular aspect, the invention relates to writing and marking instruments containing liquid inks, and it more specifically relates to the formulation of permanent inks. In one preferred form, the invention relates to improvements in ink for marking instruments for permanent marking.

2. Brief Description Of The Prior Art

There are disclosed in the prior art a number of both permanent and non-permanent inks. Inks generally are mixtures of a coloring matter dispersed or dissolved in a carrier fluid. The coloring material, if readily dissolving in the carrier fluid, is termed a dye. An insoluble coloring material is termed a pigment. Pigments are finely ground solid materials and the nature and amount of pigment contained in an ink determines its color.

Writing and marker inks may also include such ingredients as humectants, biocides, and surfactants. Humectants function to improve freeze/thaw stability and to control drying out of the marker tip, while biocides serve the obvious function of preventing spoilage of the ink during the expected shelf life of the marker product. In order to limit graininess and/or to enhance the flow characteristics of the ink, a small amount of surfactant is ordinarily employed.

Water based writing and marker inks have traditionally been nonpermanent. These prior inks are generally made by a mixture of water and a water soluble dye. While some water based marker inks may have the desirable quality of good skin and textile fugitivity, they also exhibit the undesirable quality of washing off of the writing surface. Water based writing and marker inks also tend to smear during application. After dispensed and dried, such inks are re-wettable and will again smear if later contacted with water. Water based writing and marker inks have also exhibited, at best, very limited ability to adhere to nonporous surfaces.

Hydrocarbon solvent based writing and marker inks have traditionally been permanent inks. However, along with their desirable permanency, they have had several undesirable qualities. First, the solvent systems utilized in these inks typically include such toxic hydrocarbons as toluene and xylene. Such toxic components may lead to both disposal problems and consumer rejection due to a rising appreciation of the dangers of exposure to toxic chemicals.

Solvent based inks also have a very disagreeable odor due to their hydrocarbon components. Further, solvent based writing and marker inks traditionally are easily smeared and tend to "strike through" paper readily, soaking through the material to which they are applied instead of remaining on the surface. Moreover, solvent based permanent inks are usually difficult to wash from the skin.

It is apparent from the foregoing that an ink which has a combination of the desirable qualities of both the water based and the hydrocarbon solvent based inks would be very appealing to the consumer. An even more appealing writing and marker ink would retain these desirable qualities while eliminating the undesirable qualities of lack of permanence, toxicity, odor, and "strike through" of prior inks. Thus, a writing and marker ink is desired which retains such desirable qualities as permanence, including resistance to rewetting, lack of toxicity, no "strike through," no disagreeable odors, and good skin fugitivity. In addition, the capability to adhere to nonporous surfaces such as glass, plastic or metals is, in certain applications, another desirable property. Such a writing and marker ink should also work with a variety of marking pen nib types including porous plastic, bonded fiber, composites, felt, extruded plastic and roller balls.

It is therefore a general object of the invention to provide an aqueous based permanent writing and marker ink.

It is also an object of the invention to provide a nontoxic permanent writing and marker ink.

A further object of the invention is to provide a permanent writing and marker ink which exhibits little or no "strike through."

Another object of the invention is to provide a permanent writing and marker ink which adheres well to nonporous surfaces.

A still further object of the invention is to provide an odorless, or at least not malodorous, permanent writing and marker ink.

Yet another object of the invention is to provide a permanent writing and marker ink which can be dispensed through a variety of pen nib types.

It is a secondary objective of the invention to provide a permanent writing and marker ink with good skin fugitivity.

These and other objects and advantages of the invention will be apparent to those skilled in this art from the following description of the invention and the appended claims.

SUMMARY OF THE INVENTION

The discovery of the present invention is that one may create a writing and marker ink which combines many of the most desirable qualities of both water based writing and marker inks and hydrocarbon solvent based writing and marker inks, while eliminating a great many undesirable qualities of both inks. Thus, the invention is a nontoxic aqueous permanent ink which is suitable for use in writing and marking instruments utilizing a variety of nib types.

The ink of the invention retains such desirable qualities of a water based ink as no toxicity, little or no odor, and good skin fugitivity by washing with soap and water. In addition, the composition of the invention exhibits the desirable qualities of prior hydrocarbon solvent based writing and marker inks of permanence, including resistance to smearing, and resistance to rewetting after application. This new ink may also be adapted to adhere well to such nonporous surfaces as glass, plastic, or metals.

While the present invention retains these individual desirable qualities of water based and hydrocarbon solvent based writing and marker inks, the invention eliminates many of the undesirable qualities of previously available inks. Such qualities of water based writing and marker inks as poor adherence to nonporous surfaces and poor resistance to smearing and rewetting are eliminated. The undesirable qualities of hydrocarbon solvent based writing and marker inks including disagreeable odors, toxicity, and "strike through" are also eliminated by the present invention. With the removal of toxic chemicals from the ink system, the ink is suitable for use by both children and adults. Also, potential disposal problems associated with disposal of hydrocarbon solvent based inks are eliminated.

In the first respect, the discovery is that an aqueous composition including a pigment, an alkali soluble acrylic resin, and a volatile pH regulant will yield a permanent ink. This ink is highly resistant to water damage when dry and is nontoxic when compared to previously available permanent markers containing such hydrocarbons as toluene and xylene.

Thus, in one preferred form, the invention is an aqueous permanent ink composition comprising at least about 0.1% by weight of a pigment, at least about 0.1% by weight of an alkali soluble acrylic resin, and a volatile pH regulant. Such a writing and marker ink may also advantageously include one or more of an adhesion promoter, a drying agent, and a preservative.

It is to be understood, however, that particular ink, paint, or other compositions having widely differing amounts of these components may be formulated to achieve specific results.

DETAILED DESCRIPTION

The present invention in its most basic form is an aqueous composition having at least about 0.1% by weight of a pigment, at least about 0.1% by weight of an alkali soluble acrylic resin, and a volatile pH regulant.

As the composition of the invention is dispensed from the writing or marking instrument, the alkali soluble acrylic resin and the pigment form a film. As the ink dries by the evaporation of water and the pH regulant, the pH level of the ink will decrease. Since the alkali soluble acrylic resin is only soluble at elevated pH, it falls out of solution and bonds the pigment to the surface being marked as the ink dries.

To achieve good coloring of the marker ink and promote compatibility with the remaining ink components, the pigment is utilized in the form of an aqueous dispersion, inasmuch as pigments are by definition insoluble materials. Pigment dispersions are commercially available which are combinations of a pigment, an aqueous based carrier, and a surfactant or dispersant system. A pigment dispersion may also be prepared specifically for use in the ink of the invention. From the standpoint of convenience, a commercial pigment dispersion is preferred for use in the present invention. Typical commercial dispersions contain 30 to 74% by weight active pigment ingredients.

In general, a workable pigment dispersion may have a wide or narrow particle size range depending upon the use to which the ink will be put. The lower limit on pigment particle size is determined not by any functional characteristic of the ink, but by the ability to form a stable dispersion. Similarly, the upper limit on pigment particle size is determined by the type of applicator by which the ink is to be applied or dispensed, since pigment particle size determines the ability of the pigment particles to flow through, for example, the matrix of a marker nib. Indeed, relatively larger pigment particles can restrict ink flow through many types of nibs commonly utilized in writing and marking instruments, ultimately rendering them inoperable. Larger particle sizes may, however, be used where the ink is to be used in, for example, a paint marker, in which the ink or paint composition is dispensed through a valve assembly, or in a roller ball pen.

In choosing the most suitable pigment particle size, one must be guided by the particular nib type to be utilized in the writing or marking instrument in which the ink will be placed. First, of course, a pigment particle size must be selected which will allow the passage of the composition through the nib being used. Further, the pigment particle size should be selected to promote capillary flow through the particular nib to be used in the writing or marking instrument. In general, the size of pigment particles should be kept as low as possible while maintaining the stability of the composition. For example, it has been found that in an ink to be utilized in a marking instrument having either a porous plastic nib or a bonded fiber nib, an ultrafine pigment dispersion having a mean particle size in the range of from about 0.05 to about 0.5 microns provides acceptable results. A more preferred ultrafine pigment dispersion for such applications has a mean particle size in the range of from about 0.05 to about 0.25 microns, since such a dispersion promotes better wicking or capillary flow through the nib.

The minimum concentration of pigment which will produce a workable ink is governed by the color intensity desired, though as little as 0.1% active pigment may be sufficient for certain applications. The maximum workable concentration of pigment is determined largely by the ability to maintain a stable composition, and can vary widely depending upon the concentration of the other components. It is also a function of the characteristics of the desired end product, though a practical upper limit in the formulation of, for example, a marker ink, is about 30% by weight since higher concentrations may cause ink instability and undesirably high viscosity. When a commercial pigment dispersion is utilized, as it preferably is, a practical limit is imposed by the concentration of pigment in the dispersion, which, as previously noted, is typically in the range of about 30% to 74% pigment by weight of the dispersion. The preferred concentration range for most applications is from about 2% to about 10% active pigment by weight of the composition, and a concentration of about 5% by weight is ordinarily required to ensure good coloration in a typical marker ink.

To achieve a quality of permanence in the composition of the invention, an alkali soluble acrylic resin is utilized. Acrylic resins are generally polymers or copolymers of acrylic or methacrylic esters, including such materials as styrenated acrylic copolymers, and they are sometimes referred to as acrylic varnish and lacquer resins or as acrylic film forming resins. They are commercially available as substantially pH-neutral dispersions in which the resin is not solubilized to any significant extent. As the pH of a resin dispersion is increased above neutral, the resin will dissolve.

Of principal importance is that a film of the alkali soluble acrylic resin will not redissolve upon contact with water unless the pH of the water is elevated to a level which would have been sufficient to dissolve the resin in its original state. Ordinary tap water, rain water, atmospheric condensation, or other commonly present liquids, such as spilled beverages and the like, will, of course, have insufficient alkalinity to rewet or redissolve such resins. However, when ordinary tap water is combined with a soap, the pH of the solution is increased. The increased pH of the soap solution allows the composition of the invention to be readily washed from the skin, thus achieving the objective of good skin fugitivity. Any resin which will perform in this manner is suitable for use in the composition of the invention.

The alkali soluble acrylic resins most useful in the composition of the invention are those having a molecular weight from about 30,000 to about 50,000, though the most suitable molecular weight will be determined by such variables as marking instrument nib type and surface to be marked. These resins typically have glass transition temperatures between 20 and 50 degrees centigrade and, in dispersion, have viscosities between 20 and 100 centipoise. Such resins are commercially available in solutions containing 20% to 50% by weight active resin in an aqueous dispersion.

In the usual case, at least about 0.1% by weight active alkali soluble acrylic resin must be included in the composition in order to form a stable film which gives the composition its quality of permanence. The maximum amount of a alkali soluble acrylic resin to be added to the ink composition is largely determined by the maximum desired viscosity of the ink system. It is also a function of the characteristics of the desired end product, though a practical upper limit in the formulation of, for example, a marker ink, is about 30% by weight of the composition, since higher concentrations may cause undesirably high viscosity. As in the case of commercial pigment dispersions, however, a practical limit is imposed by the concentration of resin in commercially available dispersions. Typically, as just noted, these dispersions contain about 20% to 50% by weight resin. The preferred concentration range for most applications is from about 2% to about 10% active resin by weight of the composition.

Many commercially available alkali soluble acrylic resins have sufficient resistance to smearing and rewetting so as to be useful in the present invention. For example, an alkali soluble acrylic resin dispersion manufactured by Union Carbide and sold under the trademark Carboset XL19 which is an acrylic film forming resin will work in the composition of the invention. An acrylic emulsion manufactured by S. C. Johnson and sold under the trademark Joncryl 95 will also work in the composition of the invention. One acrylic resin dispersion found to work particularly well in the composition of the invention is manufactured by Rohm and Haas and sold under the trademark Acrysol WS 24.

The ratio of the amount of pigment to the amount of resin in the composition of the invention is generally not critical to the functioning of the composition or to achieving its benefits. It is to be noted, however, that a large excess of pigment over resin may adversely affect the film-forming capability of the composition. An excess of resin over pigment affects only the degree of coloration of the resulting film.

In one preferred form of the composition of the invention, namely, a marker ink for use with a porous plastic or bonded fiber nib, a 1:1 ratio of active ingredient of pigment and active resin produces good results. For such an ink, the most preferred level of active ingredients is about 5½% by weight active ingredient of each of the resin and pigment.

A volatile pH regulant is included in the composition to maintain an alkaline pH between about 8.0 and 10.0 so that the alkali soluble acrylic resin remains in solution prior to the ink being dispensed. Upon dispensing the ink, the liquid components of the ink, including the water, the pH regulant, and any drying agent, evaporate, and the pH drops below the solubility limit of the resin. This allows the composition to form a permanent mark. Any material which is compatible with the other components of the system and which performs this function may be used as a pH regulant. Among the preferred regulants suitable for this composition are ammonium hydroxide and 2-amino-2-methyl-1-propanol.

The volatility of the pH regulant affects the time required for the ink to become water resistant, and use of a pH regulant which does not have sufficient volatility can produce an ink which might be more easily smeared after application. Thus, in general, a highly volatile pH regulant is preferred for achieving the objects of the invention. The most preferred pH regulant is ammonium hydroxide on account of its high volatility.

Additional components may optionally be added to the ink depending upon the specific use intended for the ink.

To achieve a more rapid drying rate and to improve marking characteristics upon nonporous materials, a drying agent may be added to increase the overall volatility and therefore the evaporation rate of the water and the pH regulant. Any compatible material which performs this function may be used.

The drying agent preferably should be a volatile polar material so as to ensure compatibility with the primary components of the marker ink. Straight chain $C_2-C_4$ alcohols are good, highly volatile drying agents, and, of these, ethanol is preferred because of its relatively low cost and because it does not contribute any unpleasant odor to the composition. Alcohols can also provided added benefits, such as reducing surface tension, increasing adherence of the ink to porous surfaces, and providing bactericidal activity when added to the ink composition.

To discourage improper usage of the marker ink such as ingesting the ink, the alcohol may contain a bittering agent or a conventional denaturant. An alcohol utilizing a bittering agent will discourage such improper usage of the ink by simply imparting a disagreeable taste, while not requiring the use of such toxic denaturants as methanol or benzene, and is therefore preferred. A conventional denatured alcohol may, of course, also be utilized. The most preferred drying agent is an ethyl alcohol which contains a bittering agent and which is sold under the trade name SDA 40B and is manufactured by Aaper Alcohol.

When utilized, the drying agent preferably is added from about 10% up to about 30% by weight, with the most preferred concentration being about 20% by weight, though these amounts are not critical to the practice of the invention. About 10% by weight of drying agent is ordinarily required to ensure rapid drying of the ink on a nonporous surface, while amounts in excess of about 30% by weight may adversely affect stability of the ink and may cause flocculation of the pigment unless other stabilizing additives are employed.

Inks to be used to mark on rough or nonporous surfaces may also employ an adhesion promoter to enhance physical attachment of the ink to the material to be marked. Ordinarily, the adhesion promoter is effective when present in amounts of from about 2.0% up to about 5.0% by weight, though this range is by no means critical. Use of greater than about 5% by weight of adhesion promoter may cause the ink to become unstable and cause flocculation of the pigment.

Materials which will serve the function of adhesion promoters are commercially available, and among them are the materials sold under the trademark Trionic by Petrolite. Trionic 600, for example, a dispersion of clay-treated microcrystalline wax, ethoxylated alcohol C>30, oxidized ethene homopolymer, and ethene homopolymer in water, has been found especially suitable for use in marker ink compositions.

A humectant may optionally be used, for example, to retard the drying out of a writing or marking instrument nib through which the composition of the invention is to be dispensed. Useful humectants include such products as propylene glycol or glycerine, and numerous other equivalent materials are well known in this art. The humectant may advantageously be added in amounts from about 2% up to about 20% by weight, though this range is by no means critical. The amount of humectant to be added is determined by the type of nib used in the writing or marking instrument and the protection time period desired.

To maintain the shelf life of the composition, a preservative may be added. The preservative preferably serves as both a bactericide and a fungicide, and is added in any effective amount, though a typical concentration range is from about 0.1% up to about 5.0% by weight. The use of preservatives in levels greater than about 5% by weight may cause the ink to become toxic or unstable and may, in any event, be unnecessary. Should alcohol be added to the composition as a drying agent, that alcohol will function as a preservative to some extent also.

Any conventional preservative may be utilized in the invention as long as there is compatibility with the remaining ink components. For example, preservatives manufactured by Dow Chemical Co. and sold under the trademarks Dowicil 75 (1-(3-chloroallyl)-3,5,7-triaza-1-azoniaadamantane chloride) and Dowicil 200 (3-chlorovinyl-hexamethylene tetrammonium chloride), or a preservative manufactured by Rohm and Haas and sold under the trademark Kathon PFM (isothiazolinones), or a preservative manufactured by Sutton Labs and sold under the trademark Germall II (imazolidinyl urea), or a preservative manufactured by Merck and sold under the trademark Tektamer 38 (1,2 dibromo-2,4-dicyanobutane), will work in the composition of the invention.

EXAMPLES

In formulating the compositions of the present invention, a first premix is formed by mixing the alkali soluble acrylic resin with water and adding the pH regulant until a pH between about 8.0 and about 10.0 is achieved. At this pH, the resin will dissolve into the solution. Any desired drying agent is then added to the first premix.

A second premix is then formed by adding water to the pigment dispersion. It has been found that stability of the resulting second premix, and of the final composition, is enhanced when the water is added to the pigment dispersion, rather than adding the dispersion to the water.

The first premix is then combined with the second premix, and any additional components such as an adhesion promoter, drying agent, or preservative are added. While the order of addition is not critical to the formulation of a workable composition, it has been found that greater stability is achieved when the first (resin) premix is added to the second (pigment) premix.

The following are formulated as examples of the composition of the invention.

EXAMPLES 1-4

| Component | gms | wt % | gms | wt % |
|---|---|---|---|---|
| | Example 1 Red Ink | | Example 2 Orange Ink | |
| Carboset XC19 (40% dispersion) | 25 | 25 | 15.16 | 16 |
| Deionized Water | 56 | 56 | 67.75 | 71 |
| 14% NH4OH | 0.40 | <1 | 0.44 | <1 |
| Sun Pigment Dispersions | | | | |
| RHD 6028 (45-49%) | 15 | 15 | | |
| RHD 6011 (45-49%) | 3 | 3 | | |
| OHD 6019 (38-42%) | | | 12.5 | 13 |
| | Example 3 Yellow Ink | | Example 4 Black Ink | |
| Joncryl 95 (30% dispersion) | 30.56 | 15 | 30.56 | 15 |
| Deionized Water | 140.00 | 70 | 130.00 | 65 |
| 14% NH4OH | 2.04 | 1 | 2.04 | 1 |
| Hoechst Pigment Dispersions | | | | |
| Yellow F-GR (40%) | 25.00 | 12 | | |
| Special Yellow F-HR (35%) | 2.50 | 1 | | |
| Special Black FT (30%) | | | 36.66 | 18 |

The inks of Examples 1-4 have acceptable working properties.

EXAMPLES 5-12

To formulate an ink of the invention including a drying agent and a preservative, an ink is prepared in the same manner as in Examples 1-4, and a drying agent is added to the first premix. The preservative was added after the first premix and second premix had been combined.

The following are examples of ink formulations. The reagent alcohol is a mixture of 90% ethanol, 5% methanol and 5% isopropanol.

| Component | gms | wt % | gms | wt % |
|---|---|---|---|---|
| | Example 5 Red Ink | | Example 6 Orange Ink | |
| Acrysol WS24 (36% dispersion) | 30.56 | 15 | 30.56 | 15 |
| Reagent Alcohol | 40.00 | 20 | 40.00 | 20 |
| Deionized Water | 101.64 | 50 | 99.70 | 49 |
| 14% NH4OH | 2.04 | 1 | 2.04 | 1 |
| Hoechst Pigment Dispersions | | | | |
| Red F-FRLL (40%) | 20.62 | 10 | 13.74 | 7 |
| Special Rubine F-F6B (40%) | 6.88 | 3 | | |
| Special Yellow F-HR (35%) | | | 15.70 | 8 |
| Kathon PFM | 0.30 | <1 | 0.30 | <1 |
| | Example 7 Yellow Ink | | Example 8 Black Ink | |
| Acrysol WS24 (36% dispersion) | 30.56 | 15 | 30.56 | 15 |
| Reagent Alcohol | 40.00 | 20 | 40.00 | 20 |
| Deionized Water | 101.64 | 50 | 92.48 | 46 |
| 14% NH4OH | 2.04 | 1 | 2.04 | 1 |
| Hoechst Pigment Dispersions | | | | |
| Yellow F-GR (40%) | 25.00 | 12 | | |
| Special Yellow F-HR (35%) | 2.50 | 1 | | |
| Special Black FT (30%) | | | 36.66 | 18 |
| Kathon PFM | 0.30 | <1 | 0.30 | <1 |
| | Example 9 Red Ink | | Example 10 Orange Ink | |
| Acrysol WS24 (36% dispersion) | 30.56 | 15 | 30.56 | 15 |
| Reagent Alcohol | 40.00 | 20 | 40.00 | 20 |
| Deionized Water | 104.48 | 52 | 104.64 | 52 |
| 28% NH4OH | 0.89 | <1 | 0.89 | <1 |
| Sun Pigment Dispersions | | | | |

-continued

| Component | gms | wt % | gms | wt % |
|---|---|---|---|---|
| RHD 6028 (45–49%) | 20.34 | 10 | | |
| RHD 6011 (45–49%) | 4.32 | 2 | | |
| OHD 6019 (38–42%) | | | 24.50 | 12 |
| Kathon PFM | 0.30 | <1 | 0.30 | <1 |
| | Example 11 Yellow Ink | | Example 12 Black Ink | |
| Acrysol WS24 (36% dispersion) | 30.56 | 15 | 76.40 | 15 |
| Reagent Alcohol | 40.00 | 20 | 100.00 | 20 |
| Deionized Water | 105.84 | 53 | 267.75 | 53 |
| 14% NH₄OH | 0.89 | <1 | 2.38 | <1 |
| Sun Pigment Dispersions | | | | |
| YHD 6045 (41–45%) | 18.02 | 9 | | |
| YHD 6005 (36–40%) | 5.28 | 3 | | |
| LFD 4343 (45–49%) | | | 50.00 | 10 |
| BHD 6015 (51–55%) | | | 5.10 | 1 |
| Kathon PFM | 0.30 | <1 | 0.75 | <1 |

Examples 5 through 12 formed ink which had acceptable working properties. For Examples 5 through 12 the pH ranged from 8.18 to 8.32, the viscosity ranged from 3.63 to 4.71 centipoise, and the density ranged from 8.18 to 8.38 pounds per gallon. The surface tension for these examples ranged from 29.4 to 32.94 dynes/cm.

EVALUATION OF EXAMPLES 5–12

The compositions of Examples 5–12 were evaluated for water resistance using both gloss paper and vellum paper. Marks were streaked across each sheet of paper in one pass. The mark was allowed to dry for five minutes. Each sheet was partially immersed in water so that two-thirds of each mark was immersed. After four hours of immersion, the paper was removed from the water and allowed to dry for one hour. The marks were then examined for water resistance. An ink was deemed to have acceptable water resistance if it met both of these criteria: (1) the mark did not show a marked change in color or shade, and (2) the mark did not smear when a piece of paper was placed over the mark, weighted with a two hundred gram weight, and pulled across the mark.

| | Gloss Paper | Vellum Paper |
|---|---|---|
| Example 5 | Acceptable | Acceptable |
| Example 6 | Acceptable | Acceptable |
| Example 7 | Acceptable | Acceptable |
| Example 8 | Acceptable | Acceptable |
| Example 9 | Acceptable | Acceptable |
| Example 10 | Acceptable | Acceptable |
| Example 11 | Acceptable | Acceptable |
| Example 12 | Acceptable | Acceptable |

A wet and dry adhesion test was run on various surfaces including glass, aluminum foil, acetate film, and a polyethylene jar. Marks were streaked across the surface in one pass using a marker containing the ink using a bonded polyester fiber nib. The mark was allowed to dry for five minutes. An attempt was then made to remove the mark with both a dry paper towel (dry) and a wet paper towel (wet).

The number of cycles required to achieve removal of the mark was recorded where one cycle equalled two strokes. The maximum number of cycles attempted was fifty. Moderate pressure was applied to the mark. When the mark was not completely removed during the trial, the extent of removal is indicated by the following notations: NR=No Removal; VLT=Very Slight Removal; SLT=Slight Removal; SR=Some Removal.

| Adhesion Test - No Adhesion Promoter | | | | | | | | |
|---|---|---|---|---|---|---|---|---|
| | Glass | | Aluminum Foil | | Acetate Film | | Polyethylene Jar | |
| Example | Dry | Wet | Dry | Wet | Dry | Wet | Dry | Wet |
| Example 5 | 3 | 0.5 | 5 | 20 SR | 25 | 50 NR | 50 SLT | 10 |
| Example 6 | 10 | 1 | 50 NR | 50 SR | 50 NR | 50 NR | 50 SLT | 10 |
| Example 7 | 7 | 1.5 | 30 SLT | 50 NR | 50 NR | 50 NR | 50 NR | 20 |
| Example 8* | 2.5 | 0.5 | 1 | 0.5 | 2.5 | 10 SLT | 10 Most | 2 |
| Example 9 | 3 | 2 | 5 | 20 SR | 25 | 50 NR | 50 SLT | 50 SLT |
| Example 10 | 2.5 | 1 | 20 | 20 | 50 SLT | 25 | 50 SLT | 15 |
| Example 11 | 7 | 1 | 14 | 50 SLT | 50 NR | 25 SR | 50 SLT | 20 |
| Example 12 | 50 SLT | 2 | 5 | 20 | 25 | 50 VLT | 10 Most | 50 NR |

*Maximum of ten cycles run on Example 8

EXAMPLES 13–20

The formulate an ink of the invention including an adhesion promoter, a drying agent and a preservative, an ink is prepared in the same manner as in Examples 5–12, except that an adhesion promoter is added to the ink just prior to the addition of the preservative. The reagent alcohol used is a mixture of 90% ethanol, 5% methanol and 5% isopropanol.

| Component | gms | wt % | gms | wt % |
|---|---|---|---|---|
| | Example 13 Red Ink | | Example 14 Orange Ink | |
| Acrysol WS24 (36% dispersion) | 30.56 | 15 | 30.39 | 15 |
| Reagent Alcohol | 39.78 | 20 | 39.78 | 20 |
| Deionized Water | 93.42 | 47 | 91.48 | 46 |
| 28% NH₄OH | 0.60 | <1 | 0.60 | <1 |
| Hoechst Pigment Dispersions | | | | |
| Red F-FRLL (40%) | 20.62 | 10 | 13.74 | 7 |
| Special Rubine F-F6B (40%) | 6.88 | 3 | | |
| Special Yellow F-HR (35%) | | | 15.70 | 8 |
| Kathon PFM | 0.30 | <1 | 0.30 | <1 |
| Trionic 600 | 8.00 | 4 | 8.00 | 4 |
| | Example 15 Yellow Ink | | Example 16 Black Ink | |
| Acrysol WS24 (36% dispersion) | 30.39 | 15 | 30.39 | 15 |
| Reagent Alcohol | 39.78 | 20 | 39.78 | 20 |
| Deionized Water | 93.42 | 47 | 84.26 | 42 |
| 28% NH₄OH | 0.60 | <1 | 0.60 | <1 |
| Hoechst Pigment Dispersions | | | | |
| Yellow F-GR (40%) | 25.00 | 13 | | |
| Special Yellow F-HR (35%) | 2.50 | 1 | | |
| Special Black FT (30%) | | | 36.66 | 18 |
| Kathon PFM | 0.30 | <1 | 0.30 | <1 |
| Trionic 600 | 8.00 | 4 | 8.00 | 4 |
| | Example 17 Red Ink | | Example 18 Orange Ink | |
| Acrysol WS24 (36% dispersion) | 30.39 | 15 | 30.39 | 15 |
| Reagent Alcohol | 39.78 | 20 | 39.78 | 20 |
| Deionized Water | 96.26 | 48 | 96.42 | 48 |
| 28% NH₄OH | 0.60 | <1 | 0.60 | <1 |
| Sun Pigment Dispersions | | | | |
| RHD 6028 (45–49%) | 20.34 | 10 | | |
| RHD 6011 (45–49%) | 4.32 | 2 | | |
| OHD 6019 (38–42%) | | | 24.50 | 12 |
| Kathon PFM | 0.30 | <1 | 0.30 | <1 |
| Trionic 600 | 8.00 | 4 | 8.00 | 4 |
| | Example 19 | | Example 20 | |

-continued

| Component | gms | wt % | gms | wt % |
|---|---|---|---|---|
| | Yellow Ink | | Black Ink | |
| Acrysol WS24 (36% dispersion) | 30.39 | 15 | 30.39 | 15 |
| Reagent Alcohol | 39.78 | 20 | 39.78 | 20 |
| Deionized Water | 97.62 | 49 | 98.88 | 49 |
| 28% NH4OH | 0.60 | <1 | 0.60 | <1 |
| Sun Pigment Dispersions | | | | |
| YHD 6045 (41–45%) | 18.02 | 9 | | |
| YHD 6005 (36–40%) | 5.28 | 3 | | |
| LFD 4343 (45–49%) | | | 20.00 | 10 |
| BHD 6015 (51–55%) | | | 2.04 | 1 |
| Kathon PFM | 0.30 | <1 | 0.30 | <1 |
| Trionic 600 | 8.00 | 4 | 8.00 | 4 |

The inks of Examples 13-20 had acceptable working properties.

EVALUATIONS OF EXAMPLES 13-20

The inks of Examples 13-20 were evaluated in the same manner previously described for wet and dry adhesion.

| | Adhesion Test - With Adhesion Promoter | | | | | | | |
|---|---|---|---|---|---|---|---|---|
| | Glass | | Aluminum Foil | | Acetate Film | | Polyethylene Jar | |
| Example | Dry | Wet | Dry | Wet | Dry | Wet | Dry | Wet |
| Example 13 | 50 NR | 0.5 | 50 NR | 50 VLT | 50 NR | 50 NR | 50 NR | 10 |
| Example 14 | 50 NR | 1 | 50 NR | 26 | 50 NR | 50 NR | 50 NR | 10 |
| Example 15 | 50 NR | 1 | 50 NR | 50 NR | 50 NR | 50 NR | 50 NR | 20 |
| Example 16 | 15 SR | 0.5 | 50 SLT | 20 | 25 NR | 50 NR | 50 NR | 50 NR |
| Example 17 | 50 NR | 2 | 50 NR | 50 NR | 50 NR | 50 NR | 50 NR | 50 NR |
| Example 18 | 50 NR | 1 | 50 NR | 50 SLT | 50 NR | 40 SLT | 50 NR | 25 |
| Example 19 | 50 NR | 1 | 50 NR | 50 NR | 50 NR | 50 NR | 50 NR | 20 |
| Example 20 | 50 NR | 2 | 50 NR | 20 SR | 50 NR | 50 NR | 50 NR | 50 NR |

EXAMPLES 21-28

To formulate an ink of the invention including an adhesion promoter, a drying agent including a bittering agent and a preservative, Examples 21-28 were prepared in the same manner as Examples 13-20. The following are examples of ink formulations.

| Component | gms | wt % | gms | wt % |
|---|---|---|---|---|
| | Example 21 Red Ink | | Example 22 Orange Ink | |
| Acrysol WS24 (36% dispersion) | 45.47 | 15 | 45.47 | 15 |
| SDA 40B Alcohol | 59.51 | 20 | 59.51 | 20 |
| Deionized Water | 139.97 | 47 | 137.06 | 46 |
| 28% NH4OH | 1.35 | <1 | 1.35 | <1 |
| Hoechst Pigment Dispersions | | | | |
| Red F-FRLL (40%) | 30.93 | 10 | 20.61 | 7 |
| Special Rubine F-F6B (40%) | 10.32 | 3 | | |
| Special Yellow F-HR (35%) | | | 23.555 | 8 |
| Kathon PFM | 0.45 | <1 | 0.45 | <1 |
| Trionic 600 | 12.00 | 4 | 12.00 | 4 |
| | Example 23 Yellow Ink | | Example 24 Black Ink | |
| Acrysol WS24 (36% dispersion) | 45.47 | 15 | 45.47 | 15 |
| SDA 40B Alcohol | 59.51 | 20 | 59.51 | 20 |
| Deionized Water | 139.97 | 47 | 132.2344 | |
| 28% NH4OH | 1.353 | <1 | 1.35 | <1 |
| Hoechst Pigment Dispersions | | | | |
| Yellow F-GR (40%) | 37.50 | 13 | 20.61 | 7 |
| Special Yellow F-HR (35%) | 3.75 | 1 | | |
| Special Black FT (30%) | | | 54.99 | 18 |
| Kathon PFM | 0.45 | <1 | 0.45 | <1 |
| Trionic 600 | 12.00 | 4 | 6.00 | 2 |
| | Example 25 Red Ink | | Example 26 Orange Ink | |
| Acrysol WS24 (36% dispersion) | 45.47 | 15 | 45.47 | 15 |
| SDA 40B Alcohol | 59.51 | 20 | 59.51 | 20 |
| Deionized Water | 144.23 | 48 | 144.37 | 48 |
| 28% NH4OH | 1.35 | <1 | 1.35 | <1 |
| Sun Pigment Dispersions | | | | |
| RHD 6028 (45–49%) | 30.51 | 10 | | |
| RHD 6011 (45–49%) | 6.48 | 2 | | |
| OHD 6019 (38–42%) | | | 36.75 | 12 |
| Kathon PFM | 0.45 | <1 | 0.45 | <1 |
| Trionic 600 | 12.00 | 4 | 12.00 | 4 |
| | Example 27 Yellow Ink | | Example 28 Black Ink | |
| Acrysol WS24 (36% dispersion) | 45.47 | 15 | 45.47 | 15 |
| SDA 40B Alcohol | 59.51 | 20 | 59.51 | 20 |
| Deionized Water | 146.27 | 49 | 148.16 | 49 |
| 28% NH4OH | 1.35 | <1 | 1.35 | <1 |
| Sun Pigment Dispersions | | | | |
| YHD 6028 (41–45%) | 27.03 | 9 | | |
| YHD 6005 (45–49%) | 7.92 | 3 | | |
| LFD 4343 (45–49%) | | | 30.00 | 10 |
| BHD 6015 (51–55%) | | | 3.06 | 1 |
| Kathon PFM | 0.45 | <1 | 0.45 | <1 |
| Trionic 600 | 12.00 | 4 | 12.00 | 4 |

The ink formed from this composition had acceptable working properties and performed with similar characteristics to inks formed with reagent alcohol.

EXAMPLE 29

An ink of the invention may also be used in a paint marker which utilizes a valve assembly for ink dispensing. The ink of Example 29 is prepared in the same manner as previous inks.

| | Example 29 Blue Ink | |
|---|---|---|
| Component | gms | wt % |
| Acrysol WS24 (36% dispersion) | 29.63 | 30 |
| SDA 40B Alcohol | 9.70 | 10 |
| Deionized Water | 36.40 | 36 |
| 28% NH4OH | 1.66 | 2 |
| Sun Pigment Dispersion BHD 6015 (51–55%) | 22.44 | 22 |
| Kathon PFM | 0.15 | <1 |

The ink of Example 29 has a viscosity of 13.18 centipoise and a pH of 9.73. The ink has acceptable working properties.

From the foregoing description and examples, it is apparent that the objects of the present invention have been achieved. The aqueous permanent pigment ink provides a permanent marking ink which is nontoxic, exhibits good skin fugitivity, has little or no odor, and exhibits minimal paper "strike through," while toxic chemicals found in prior permanent inks such as toluene and xylene are eliminated.

While only certain embodiments have been set forth, alternative embodiments and various modifications will be apparent to those skilled in the art. These and other alternatives are considered equivalents and within the spirit and scope of the present invention.

What is claimed is:

1. A marking instrument having a porous plastic or a bonded fiber nib and containing an aqueous ink composition, said composition comprising
   (a) from 0.1% to 30% by weight of a pigment having a mean particle size range of from about 0.05 to about 0.50 microns;
   (b) from 0.1% to 30% by weight of an alkali soluble acrylic resin,
   (c) a sufficient amount of a volatile pH regulant, to adjust the pH of said ink to from about 8 to about 10, and
   (d) an aqueous carrier,
   the molecular weight of the acrylic resin being at least about 30,000, said resin being dissolved in the aqueous carrier in the presence of said amount of volatile pH regulant and being insoluble in said carrier in the absence of said pH regulant.

2. The marking instrument of claim 1 wherein the alkali soluble acrylic resin has a molecular weight from about 30,000 to about 50,000.

3. The marking instrument of claim 2 wherein the volatile pH regulant is selected from the group consisting of ammonium hydroxide and 2-amino-2-methyl-1-propanol.

* * * * *